United States Patent
Nowak et al.

(10) Patent No.: US 10,298,765 B2
(45) Date of Patent: May 21, 2019

(54) SYSTEM AND METHOD FOR SELECTING AGENTS TO IMPROVE CALL ROUTING

(71) Applicant: Avaya Inc., Santa Clara, CA (US)

(72) Inventors: Dawid Nowak, Dublin (IE); Tony McCormack, Galway (IE)

(73) Assignee: Avaya Inc., Santa Clara, CA (US)

( * ) Notice: Subject to any disclaimer, the term of this patent is extended or adjusted under 35 U.S.C. 154(b) by 211 days.

(21) Appl. No.: 14/516,783

(22) Filed: Oct. 17, 2014

(65) Prior Publication Data

US 2016/0112568 A1    Apr. 21, 2016

(51) Int. Cl.
*H04M 3/00* (2006.01)
*H04M 3/523* (2006.01)
*H04M 3/51* (2006.01)
*G06Q 10/06* (2012.01)

(52) U.S. Cl.
CPC .... *H04M 3/5233* (2013.01); *G06Q 10/06393* (2013.01); *H04M 3/5175* (2013.01); *H04M 3/5183* (2013.01)

(58) Field of Classification Search
CPC . H04M 3/5175; H04M 3/5183; H04M 3/5233
USPC ......................... 379/265.01, 265.05
See application file for complete search history.

(56) References Cited

U.S. PATENT DOCUMENTS

| | | | |
|---|---|---|---|
| 7,536,002 B1 * | 5/2009 | Ma | H04M 3/493 379/265.02 |
| 2010/0332514 A1 * | 12/2010 | Steele | G06F 7/02 707/769 |

* cited by examiner

*Primary Examiner* — Rasha S Al Aubaidi
(74) *Attorney, Agent, or Firm* — Stevens & Showalter, LLP

(57) ABSTRACT

A call managing computer system for managing at least one communication session in an enterprise is disclosed. The call managing computer system includes a monitoring module for monitoring context of the at least one communication session. The system further includes a strategy generation module for generating the at least one strategy based on the monitored context of the at least one communication session and one or more performance indicators. The system further includes a validation module for validating the at least one generated strategy. The system further includes an agent selection module for executing the at least one validated strategy to select at least one agent for the at least one communication session.

19 Claims, 9 Drawing Sheets

SYSTEM AND METHOD FOR SELECTING AGENTS TO IMPROVE CALL ROUTING

BACKGROUND

Field

Embodiments of the present invention generally relate to a system and method to provide customer service and particularly to a system and method for improving call routing process by utilizing resource selection strategies.

Description of Related Art

Contact centers are employed by many enterprises to service, inbound and outbound contacts or customers. A primary objective of contact center management is to ultimately maximize contact center performance and profitability. An ongoing challenge in contact center administration is monitoring and optimizing contact center efficiency usage of its available resources. The contact center efficiency is generally measured by metrics such as Service Level Agreement (SLA), Customer Satisfaction (CSAT), and match rate. Contact center resources may include, agents, communication assets (e.g., number of voice trunks, number and bandwidth of video trunks, etc.), computing resources (e.g., a speed, a queue length, a storage space, etc.), and so forth.

Service level is one measurement of the contact center efficiency. Service level is typically determined by dividing the number of contacts accepted within a specified period by the number accepted plus number that were not accepted, but completed in some other way (e.g., abandoned, given busy, canceled, flowed out). Service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent in a queue over the same period. An agent with a primary skill level is one who typically may handle contacts of a certain nature more effectively and/or efficiently as compared to an agent of lesser skill level. There are other contact center agents who may not be as proficient as the primary skill level agent, and those agents are identified either as skill level agents or backup skill level agents.

As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with the service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness and the like, to calculate performance relative to their Service Level Agreements ("SLAs"). Operational efficiency is achieved when the KPIs are managed near, but not above, SLA threshold levels.

Throughput is a measure of the number of contacts/contact requests or work requests that may be processed in a given amount of time. Agent utilization is a measure of how efficiently the agents' time is being used. Customer service level is a measure of the time customers spend waiting for their work to be handled. Company contact center customers wish to provide service to as many requests as possible in a given amount of time, using the least number of agents to do so, and minimizing the wait time for their customers that may increase the Service Level Agreement (SLA) of the contact center. Further, the contact center may also have to maintain the Customer Satisfaction (CSAT) metrics in order to maintain the KPIs of the contact center. For this purpose, agents may have to maintain the quality of services provided to the customers through multimedia (e.g., voice contacts, video contacts, emails, etc.).

Generally, agents are selected based on routing strategies for providing customer services. These routing strategies are resource selection strategies that are generated within the contact center. The routing strategies can be considered as a prescribed process or a technique to find a most suitable resource for an incoming work request and/or how to match a resource to an incoming work request, and the like. These routing strategies are an integral part of the contact centers, which makes it difficult to add and/or modify these routing strategies. Therefore, it is hard to modify and/or generate new selection strategies within the contact center without a major update in conventional systems.

Conventionally, customers are generally flooded with options to select predefined routing strategies. The customers can select a predefined routing strategy from a list of available predefined routing strategies and then customer services are provided based on the selected strategies. However, in these techniques, the customers do not have an option to execute their own bespoke routing strategies within the contact center.

Further, as more and more customer requirements are solidifying and new strategies are being considered, variations of same predefined routing strategies are being statistically linked in a routing engine. This may result in increasing complexity and maintenance cost of the routing engine within the contact center. Also, if contact centers craft more selection strategies based on the needs of the customers, then this may further create a management and implementation burden on routing engines of the contact centers.

There is thus a need for a system and method for selecting agents to improve call routing by using resource selection strategies in an enterprise.

SUMMARY

Embodiments in accordance with the present invention provide a call managing computer system for managing at least one communication session in an enterprise. The call managing computer system includes a monitoring module for monitoring context of the at least one communication session. The system further includes a strategy generation module for generating the at least one strategy based on the monitored context of the at least one communication session and one or more performance indicators. The system further includes a validation module for validating the at least one generated strategy. The system further includes an agent selection module for executing the at least one validated strategy to select at least one agent for the at least one communication session.

Embodiments in accordance with the present invention further provide a computer-implemented method for managing at least one communication session in an enterprise. The method includes monitoring context of at least one real time communication; generating at least one customer supplied strategy based on the monitored context of the at least one real time communication; validating the at least one generated strategy; and executing the at least one validated strategy to select at least one agent for the at least one communication session.

Embodiments in accordance with the present invention provide a call managing computer system for managing at least one communication session in an enterprise. The call managing computer system includes a parameter selection module for selecting one or more performance indicators of the at least one communication session. The system further includes a strategy generation module for generating the at least one strategy based on the selected one or more performance indicators. The system further includes a validation module for validating the at least one generated strategy. The system further includes an agent selection module for executing the at least one validated strategy to select at least one agent for the at least one communication session.

Embodiments of the present invention may provide a number of advantages. First, embodiments of the present invention provide a system and a method for managing a communication session. Embodiments of the present application provide the system and the method for generating a customer specified strategy to select a resource for providing a customer service. The customers generate their own strategies by selecting key performance indicators. Next, embodiments of the present application provide a method that enables the customers to generate different strategies without much overload. Further, embodiments of the present application provide ease of administration for administering new strategies within an enterprise. The customers may generate their own strategies at any time and then execute them in a sandbox environment.

Further, the generated strategies are valid only for the duration of a real time communication session of the customer with the contact center. Embodiments of the present application remove and/or delete a generated strategy of a customer as a real time communication session of the customer with the enterprise is completed. Next, the system displays a graphical representation that shows a comparison between results of the one or more performance indicators of the at least one generated strategy and the at least one predefined strategy.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1A:
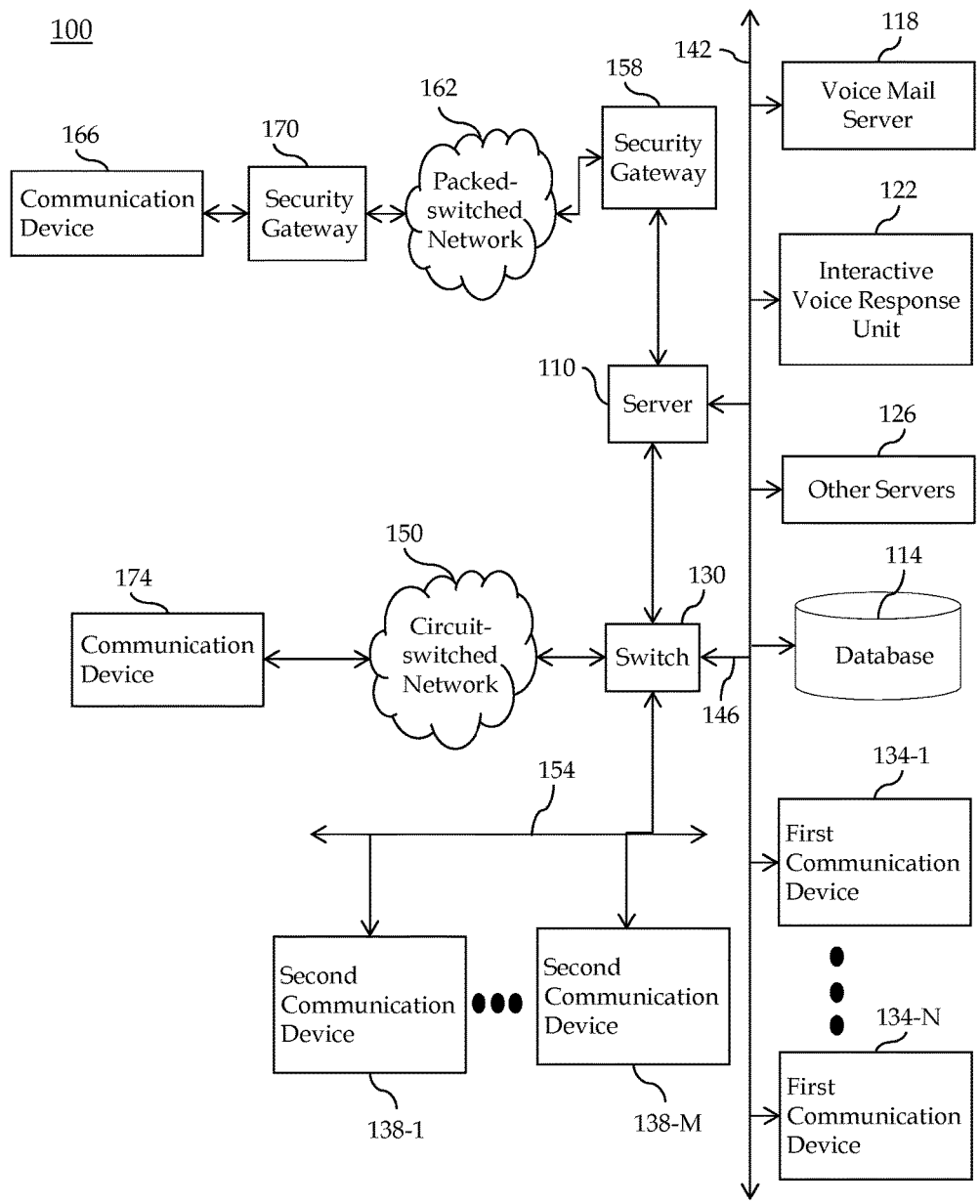
FIG. 1A illustrates a block diagram depicting a contact center, according to an embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more agents for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1A shows an illustrative embodiment of the present invention. A contact center 100 comprises a server 110, a set of data stores or database 114 containing contact and/or customer related information, resource and/or agent related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present invention, the customer and agent related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya, or another company.

Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that the embodiments of present invention do not require any particular type of information transport medium between switch, or server and first and second communication devices, i.e., the embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming work request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected agent.

Figure 1B:
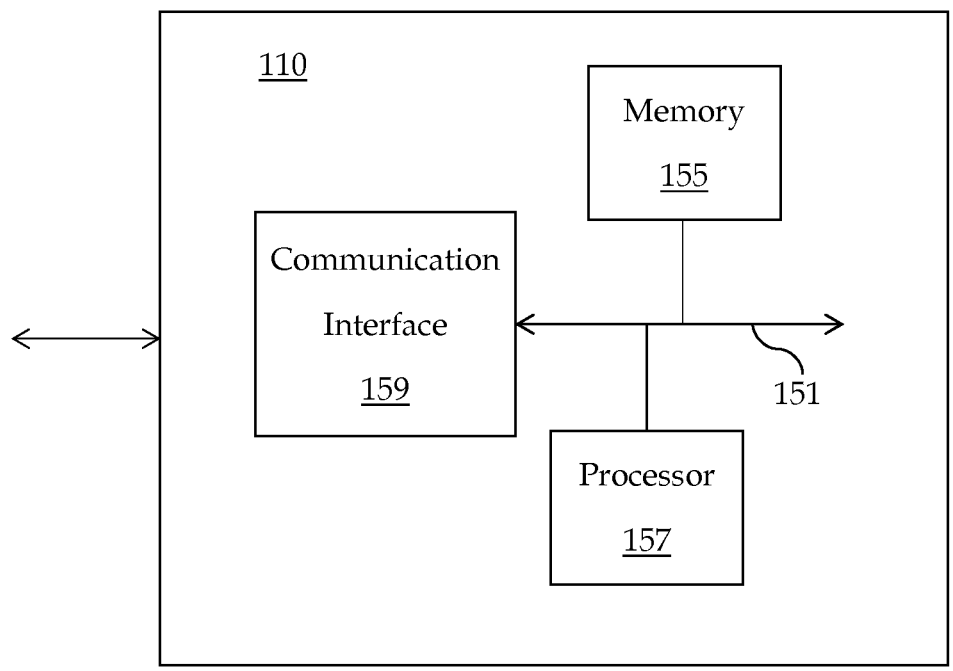
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present invention do not require the presence of packet- or circuit-switched networks.

The term "switch" or "server" as used herein should be understood to include a Private Branch Exchange (PBX), an ACD, an enterprise switch, an enterprise server, or other type of telecommunications system switch or server, as well as other types of processor-based communication control devices such as media servers, computers, adjuncts, etc.

Figure 2:
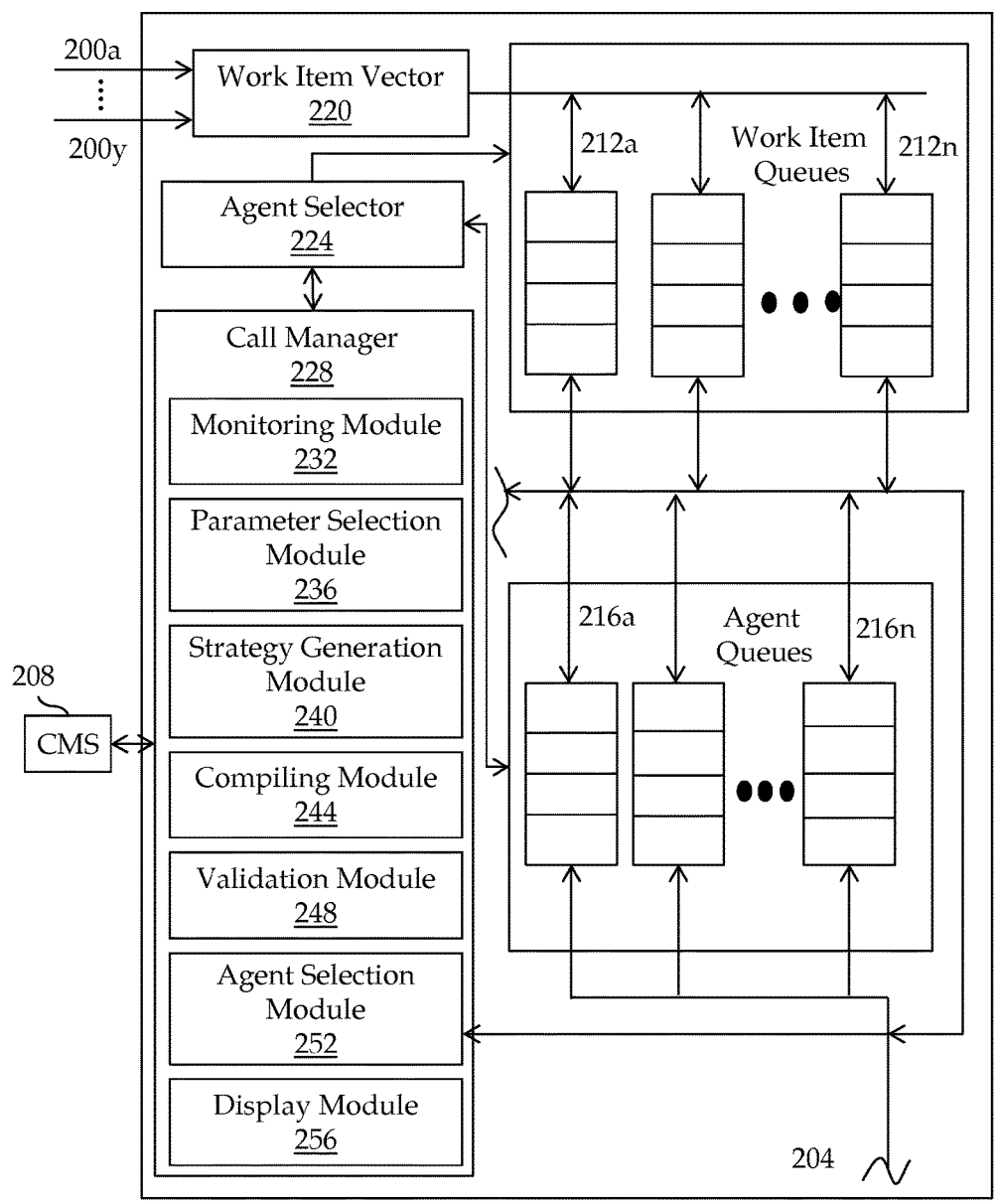
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contacts or customer communication lines 200*a-y* (which may be one or more trunks, phone lines, etc.) and an agent communication line 204 (which may be a voice-and-data transmission line such as the LAN 142 and/or a circuit switched voice line). The server 110 may include Avaya Inc.'s Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact or work item queues 212*a-n* and a separate set of agent queues 216*a-n*. Each contact queue 212*a-n* corresponds to a different set of agent queues, as does each agent queue 216*a-n*. Conventionally, contacts are either prioritized or are queued in individual ones of the contact queues 212*a-n* in their order of priority or are queued in different ones of a plurality of contact queues that correspond to a different priority. Likewise, each agent's queues are prioritized according to his or her level of expertise or skill in that queue, and agents are queued in either individual ones of agent queues 216*a-n* in their order of expertise level or in different ones of a plurality of agent queues 216*a-n* that correspond to a queue and each one of which corresponds to a different expertise level. In an embodiment of the present invention, the agent queue 216*a-n* may include a set of reserve agents queue in the contact center 100.

According to an embodiment of the present invention, included among the control programs in the server 110 is a work item vector 220. Contacts or calls incoming to the contact center 100 are assigned by the work item vector 220 to different work item queues 212*a-n* based upon a number of predetermined criteria, including a customer's identity, customer needs, contact center needs, current contact center queue lengths, a customer value, and an agent skill that is required for proper handling of the contact. Agents who are available for handling work items are assigned to the agent queues 216*a-n* based upon the skills that they possess. An agent may have multiple skills, and hence may be assigned to multiple agent queues 216*a-n* simultaneously. Furthermore, an agent may have different levels of skill expertise (e.g., skill levels 1-N in one configuration or merely primary skill levels and secondary skill levels in another configuration), and hence may be assigned to different agent queues 216*a-n* at different expertise levels.

In one configuration, the contact center 100 is operated by a contract operator (e.g., a supervisor or a manager of the contact center 100), and each of the work item queues 212*a*-*n*, and possibly each of the agent queues 216*a*-*n*, corresponds to a different client. Each client may have a separate Service Level Agreement (SLA) or other type of performance measurement agreement with the contract operator regarding performance expectations, goals, requirements or specifications for the client's respective queue(s).

Further, embodiments in accordance with the present invention may include, among the programs executing on the server 110, an agent selector 224 and a call manager computer system 228. The agent selector 224 and the call manager computer system 228 are stored either in the main memory or in a peripheral memory (e.g., disk, CD ROM, etc.) or some other computer-readable medium of the contact center 100. Further, the agent selector 224 monitors the occupants of the work item and agent queues 212*a*-*n* and 216*a*-*n*, respectively, and contact center objectives, rules, and policies and assigns agents to service incoming work requests.

The agent selector 224 distributes and connects these work items to communication devices of available agents based on strategies provided by customers. When the agent selector 224 forwards a contact (or first work item) to an agent, the agent selector 224 also forwards customer-related information from the database 114 to the agent's desktop or computer work station for previewing and/or viewing (such as by a pop-up display) to enable the agent for providing better services to the customer. Depending on the contact center configuration, the agent selector 224 may reallocate the work items to the agents of the contact center 100. The agents process the contacts or work items sent to them by the agent selector 224.

In an embodiment of the present invention, the agent and their associated data are maintained and updated in the database 114 of the contact center 100. Upon the completion of handling a work request, a generator (not shown) collects selected metrics for the work request. These metrics may include skills involved in servicing the work item, an identifier of a servicing agent, contact duration, a transaction or contact type (e.g., sale, information request, complaint, etc.), time-of-day, result of the contact (e.g., type of sale, number of units sold, an average revenue generated, etc.), and so forth. The metrics along with other statistics is typically gathered by the CMS 208.

In an exemplary embodiment of the present invention, the call manager computer system 228 is configured to manage a communication session in an enterprise. In an embodiment of the present invention, the enterprise may be a contact center. Further, the call manager computer system 228 is configured to monitor context of the communication session. Further, the call manager computer system 228 is configured to generate routing strategies based on the monitored context of the communication session. Also, the call manager computer system 228 is configured to compile and then validate the generated routing strategies. Further, the call manager computer system 228 is configured to execute the validated routing strategies to select an agent for the communication session.

According to an embodiment of the present invention, the call manager computer system 228 includes certain modules, such as, but is not restricted to, a monitoring module 232, a parameter selection module 236, a strategy generation module 240, a compiling module 244, a validation module 248, an agent selection module 252, and a display module 256. In some embodiments, one or more of the monitoring module 232, the parameter selection module 236, the strategy generation module 240, the compiling module 244, the validation module 248, the agent selection module 252, and the display module 256 may be implemented by one or more software processes running on the server 110. The server 110 may implement one or more software processes by use of the processor 157 being suitably programmed by use of software instructions stored in the memory 155 coupled to the processor 157.

The monitoring module 232 may monitor details of a call such as a type of communication session to the contact center 100, according to an embodiment of the present invention. The type of the communication session, i.e., whether the call made by a customer is, but is not restricted to, a voice session, a video session, a text message, an email, an instant messaging, a Voice over Internet Protocol (VoIP), and so forth. Further, the monitoring module 232 may monitor static details about the communication session, for example, inputs selected by the customer in an IVR menu of the contact center 100. For example, if a customer selects a button "6" for a 'car insurance' in an IVR menu and further selects a button "5" for an 'inquiry', then the monitoring module 232 may determine the customer desires to inquire about a car insurance policy. Further, the monitoring module 232 may monitor context of the communication session, according to an embodiment of the present invention. The monitoring module 232 may monitor the communication session between the customer and an agent to monitor the context of the communication session, in an embodiment of the present invention. For example, while inquiring about the car insurance policy, the customer desires to purchase the car insurance policy at the same time.

The monitoring module 232 may further extract keywords and/or parameters from the monitored communication session, according to an embodiment of the present invention. For example, the customer provides information that the customer desires to communicate with an agent who is proficient in English and sales, then English and sales may be extracted as keywords for the communication session. In an exemplary scenario, the monitoring module 232 may analyze text and extract keywords from a textual communication session such as an instant messaging, or an email, etc. If the type of the communication session is a voice session, then the monitoring module 232 may convert speech of the customer into text by a voice recognition module (not shown), which is then monitored to extract keywords for the communication session, in another exemplary scenario.

The parameter selection module 236 may select parameters for the communication session. In an embodiment of the present invention, the parameters may be, but are not restricted to, key performance indicators of the contact centers 100. The parameter selection module 236 may enable the customer to select the key performance indicators provided by the contact center 100, according to an embodiment of the present invention. The key performance indicator may include, but is not restricted to, an experience of an agent, a spoken language of an agent, a proficiency of an agent, a rating of an agent, occupancy of an agent, predicted wait time, throughput, agent performance, and the like. The key performance indicators may further be associated with a data value, in an embodiment of the present invention. In an exemplary scenario, the customer may select one or more key performance indicators for the communication session.

The parameter selection module 236 may enable the customer to select key performance indicators based on the calendar, in an exemplary scenario. For example, the customer may select one or more key performance indicators that may be used to generate a strategy for use on weekdays and may further select different one or more key performance indicators that may be used to generate a strategy for use on weekends.

Further, the parameter selection module 236 may enable the customer to select predefined strategies, according to an embodiment of the present invention. The predefined strategies may be generated by the contact center 100, in an embodiment of the present invention. The predefined strategies may be stored in the database 114 of the contact center 100 and the customer may select the strategies by using a Representational State Transfer (REST) interface, according to an embodiment of the present invention. In another embodiment of the present invention, the customer may select the predefined strategies by using an application provided by the contact center 100. The application may be downloaded in a user device associated with the customer.

The strategy generation module 240 may generate a strategy based on the monitored context of the communication session, according to an embodiment of the present invention. In an exemplary embodiment of the present invention, the strategy may be, for example, but is not limited to, a customer supplied strategy that may be used to select a resource for the communication session. The strategy generation module 240 may automatically generate a resource selection strategy based on the monitored context, selected parameters, or a combination thereof, of the communication session, in an embodiment of the present invention. The resource selection strategy, may include, for example, but is not limited to, an idle strategy, occupancy strategy, a proficiency strategy, a priority strategy, and the like.

The idle strategy may include, but is not restricted to, a time when an agent was on a call last, whether an agent is available, agent is on a lunch break, and the like. The occupancy strategy may define, for example, how occupied an agent was in last hour, or ten minutes, etc. The occupancy may define an amount of work request that may be assigned to an agent of the contact center 100 at the time the customer is selecting the parameters for the communication session, in an embodiment of the present invention. The proficiency strategy may be based on the proficiency of an agent in handling incoming work requests. Further, the priority strategy may be based on priorities defined by the customer of the contact center 100. For example, if a customer desires to communicate with a highly skilled agent and who is available at a time, then a highly skilled agent having least assigned work requests is selected as the priorities of the customer.

Further, the strategy generation module 240 may generate a strategy based on the monitored context, selected parameters, or a combination thereof, according to an embodiment of the present invention. In an exemplary scenario, a customer selects parameters such as, an experience of two years or more, proficient in speaking English, and least occupied agent, then a strategy is generated based on these parameters. In another exemplary scenario, a customer selects parameters such as, an experience of five years, proficient in English language and sales then a strategy is generated based on the parameters selected by the customer in an IVR menu of the contact center 100.

The compiling module 244 may compile the generated strategy of the customer. In an embodiment of the present invention, the compiling module 244 may include, but is not restricted to, a set of tools and/or libraries that may allow the customers to implement their own generated strategies. In an exemplary scenario, the compiling module 244 may be utilized as a Software Development Kit (SDK) in which the generated strategy may be compiled. The compiling module 244 may compile a source code of the generated strategy into a machine code or a byte code.

In an embodiment of the present invention, the source code of the generated strategy may be generated at a time when the customer selects options in the IVR menu of the contact center 100. The source code may be compiled into a Java byte code, in an embodiment of the present invention. In another embodiment of the present invention, other software may also be used to compile the source code of the generated strategies within the contact center 100.

Further, the compiling module 244 may utilize a reflection mechanism to analyze and optimize the structure and/or behavior of the byte code at a run-time, in an embodiment of the present invention. Also, the reflection mechanism may enable the contact center 100 to re-instantiate and/or re-create a new byte code that is provided by the customer. Further, the compiling module 244 may provide mechanisms to package and seal the byte code by using certificates to ensure authenticity and security of the byte code, in an embodiment of the present invention. The compiling module 244 may then transmit the compiled strategy and its byte code along with a routing request to the validation module 248.

The validation module 248 may validate the compiled strategy based on predefined parameters, according to an embodiment of the present invention. The predefined attributes may include, for example, but is not restricted to, available static memory, available heap memory, a processor, a stack size, a number of threads, and the like, in an embodiment of the present invention. The generated strategy may be rejected by the validation module 248 when a data value of any of the parameter exceeds a predefined threshold of the attributes, in an embodiment of the present invention.

Further, the validation module 248 may ensure that the compiled strategy may not create new threads to affect the working of the agent selector 224 in the contact center 100. In an embodiment of the present invention, Java Platform, Micro Edition (Java ME) may ensure that the compiled strategy may not create new threads to affect the working of the agent selector 224 in the contact center 100. In another embodiment of the present invention, other software platforms may also be used. Further, the validation module 248 may transmit the validated strategy to the agent selection module 252 along with the routing request, according to an embodiment of the present invention.

The agent selection module 252 may execute the validated strategy to select a resource for the communication session, according to an embodiment of the present invention. The resource may include, but is not restricted to, a reserve agent, an agent, a Subject Matter Expert (SME), a supervisor, and the like. The selected resource may then provide a customer service to the customer. The agent may be selected based on the strategy generated based on the monitored context, customer selected parameters, or a combination thereof, in an embodiment of the present invention. The agent selection module 252 may execute the generated strategy as it may execute predefined strategies of the contact center 100, in an embodiment of the present invention.

The display module 256 may display a graphical and/or a visual representation of the key performance indicators on the consumer device. In an embodiment of the present invention, the graphical and/or visual representation may be displayed on the customer device, which shows a comparison between results of the one or more performance indicators of the at least one generated strategy and the at least one predefined strategy. In an embodiment of the present invention, the customer device may include, but is not restricted to, a computer, a laptop, a Personal Digital Assistance (PDA), a tablet, a smart phone, a palmtop, a netbook, or any other communication enabled computing device.

Further, based on the performance of the customer generated strategy, the customer may optimize the strategy by modifying the parameters for the communication session and/or may generate a new strategy.

Figure 3:
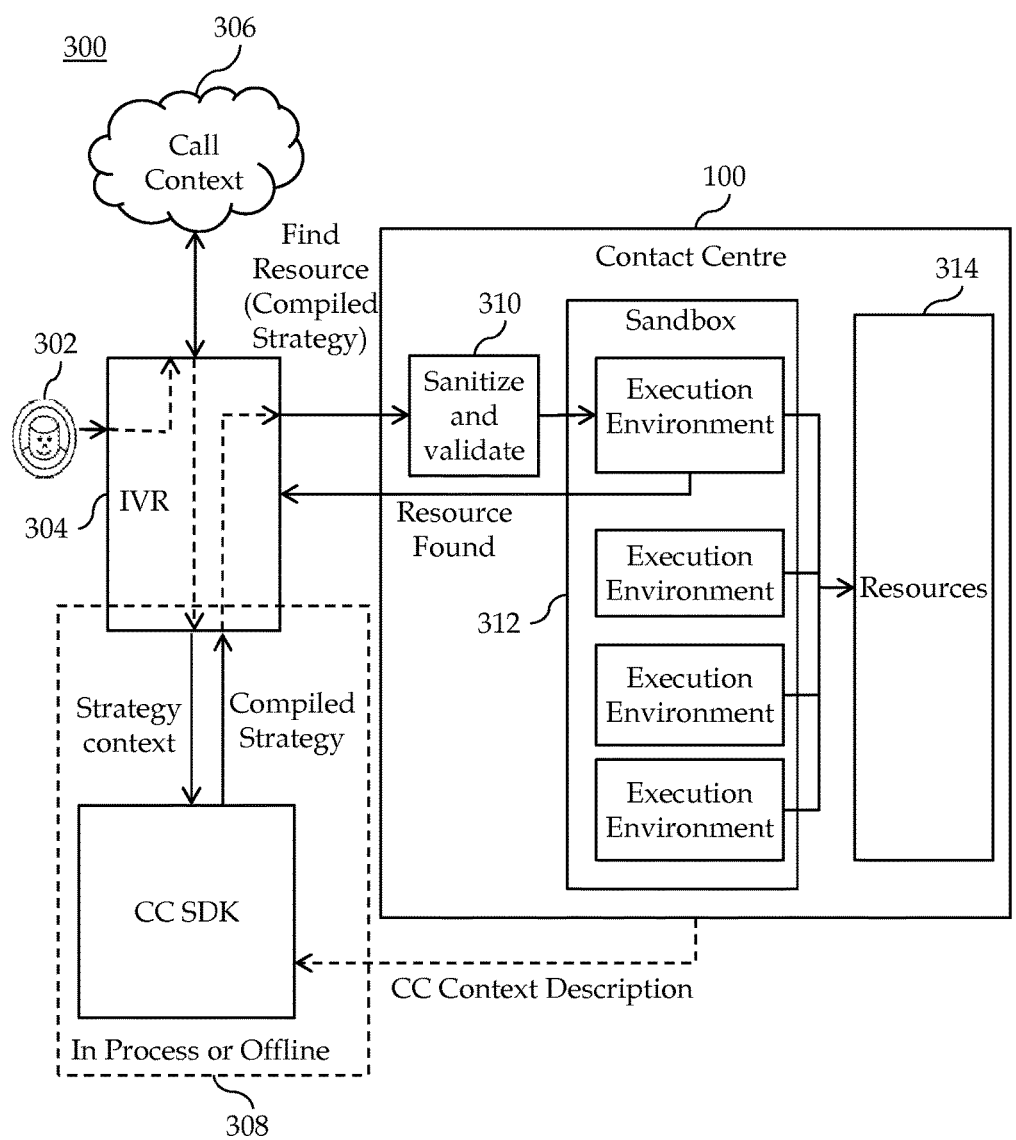
FIG. 3 illustrates a process flow for managing a real time communication in an environment where various embodiments of the present invention may be implemented, according to an embodiment of the present invention.

FIG. 3 illustrates a process flow 300 for managing a real time communication in an environment where various embodiments of the present invention may be implemented, according to an embodiment of the present invention. A customer 302 selects options from an Interactive Voice Response (IVR) 304 to start a real time communication session with a resource of a contact center 100. The IVR 304 monitors context of the real time communication 306 and then extracts keywords from the monitored real time communication. A source code is generated for the monitored context of the real time communication. The context and its source code are then transmitted to a Contact Center Software Development Kit (CC SDK) 308. The CC SDK 308 then compiles the source code and generates a byte code for a strategy generated based on the monitored context of the real time communication. In an embodiment of the present invention, the customer 302 may compile the source code at any time such as in process, e.g., during a real time communication session, or offline, e.g., when no communication session is requested by the customer 302. Further, the byte code of the compiled strategy is then transmitted along with a routing request to a sanitize and validate block 310.

The sanitize and validate block 310 validates the received generated strategy based on predefined attributes, for example, an available static memory, an available heap memory, a stack size, etc. If the generated strategy is validated, then the generated strategy is executed in a sandbox environment 312 that may instantiate the strategy within the contact center 100. In an exemplary scenario, the sandbox environment 312 may enable the customer 302 to execute and test the generated strategy in isolation without affecting the strategies of other customers. A resource is selected from a pool of resources 314 to provide a customer service to the customer 302. The resource is selected based on the strategy executed in the sandbox environment 312. Further, a CC Context Description is transmitted from the contact center 100 to the CC SDK 308, which provides a basic profile having information, for example, number of users, key performance indicators, size of source code supported by a contact center, memory size of a contact center, and the like, associated with the contact center 100. The CC SDK 308 then mimic as the contact center 100 while compiling the source code for the real time communication.

Figure 4:
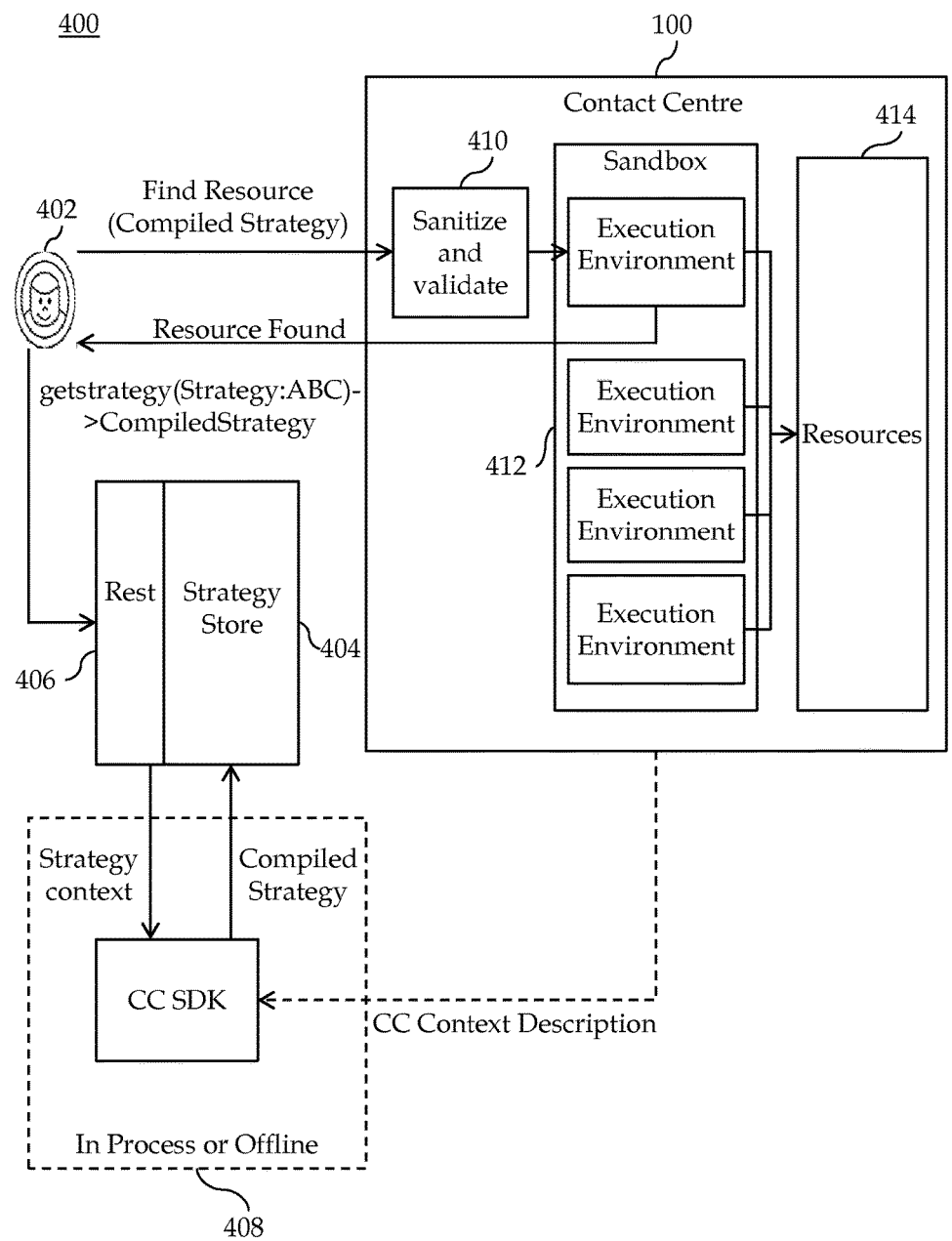
FIG. 4 illustrates a process flow for managing a real time communication in an environment where various embodiments of the present invention may be implemented, according to another embodiment of the present invention.

FIG. 4 illustrates a process flow 400 for managing a real time communication in an environment where various embodiments of the present invention may be implemented, according to another embodiment of the present invention. A customer 402 selects a predefined strategy from a strategy store 404. The strategy store 404 may be a database that include, but are not limited to, predefined routing strategies that may be created by the contact center 100. The customer 402 selects one of the predefined strategies by using a Representational State Transfer (REST) interface 406. The REST interface 406 is a Hypertext Transfer Protocol (HTTP) that may enable the customer to access to the strategy store 404 through a web server (not shown).

In an embodiment of the present invention, the strategies stored in the strategy store 404 are compiled strategies. This may then eliminate the compiling time of the strategy within the contact center 100. In another embodiment of the present invention, the strategies stored in the strategy store 404 are in a raw format that is further transmitted to a Contact Center Software Development Kit (CC SDK) 408. In an embodiment of the present invention, the customer 302 may compile the source code at any time such as in process, e.g., during a real time communication session, or offline, e.g., when no communication session is requested by the customer 402. The CC SDK 408 then compiles the source code and generates a byte code for the selected strategy from the strategy store 404.

In another embodiment, the strategies may be offered as a premium to customers. Specifically, strategies may be offered for a fee or associated with service level agreements per strategy or groups of strategies. In one example, the customer would pay for one or a group of strategies. In addition, there could be a limited number of times (e.g., N times) that the strategy(ies) could be used depending upon the service level purchased by the customer. These strategies can be pre-compiled for such customers per the service level agreement terms and conditions.

Further, the byte code of the generated strategy is transmitted along a routing request to a sanitize and validate block 410 to find a resource for the real time communication session. The sanitize and validate block 410 validates the received generated strategy based on predefined attributes, for example, an available static memory, an available heap memory, a stack size, etc. If the generated strategy is validated, then the generated strategy is executed in a sandbox environment 412 that may instantiate the strategy. A resource is selected from a pool of resources 414 to provide a customer service to the customer 402. The resource is selected based on the strategy executed in the sandbox environment 412. If a resource is selected based on the strategy then a signal and/or an alert is provided to the customer 402 that a resource is found based on the selected strategy. Further, a CC Context Description is transmitted from the contact center 100 to the CC SDK 408, which provides a basic profile having information, for example, number of users, key performance indicators, size of source code supported by a contact center, memory size of a contact center, and the like associated with the contact center 100. The CC SDK 408 then mimic as a contact center 100 while compiling the source code for the real time communication.

Figure 5:
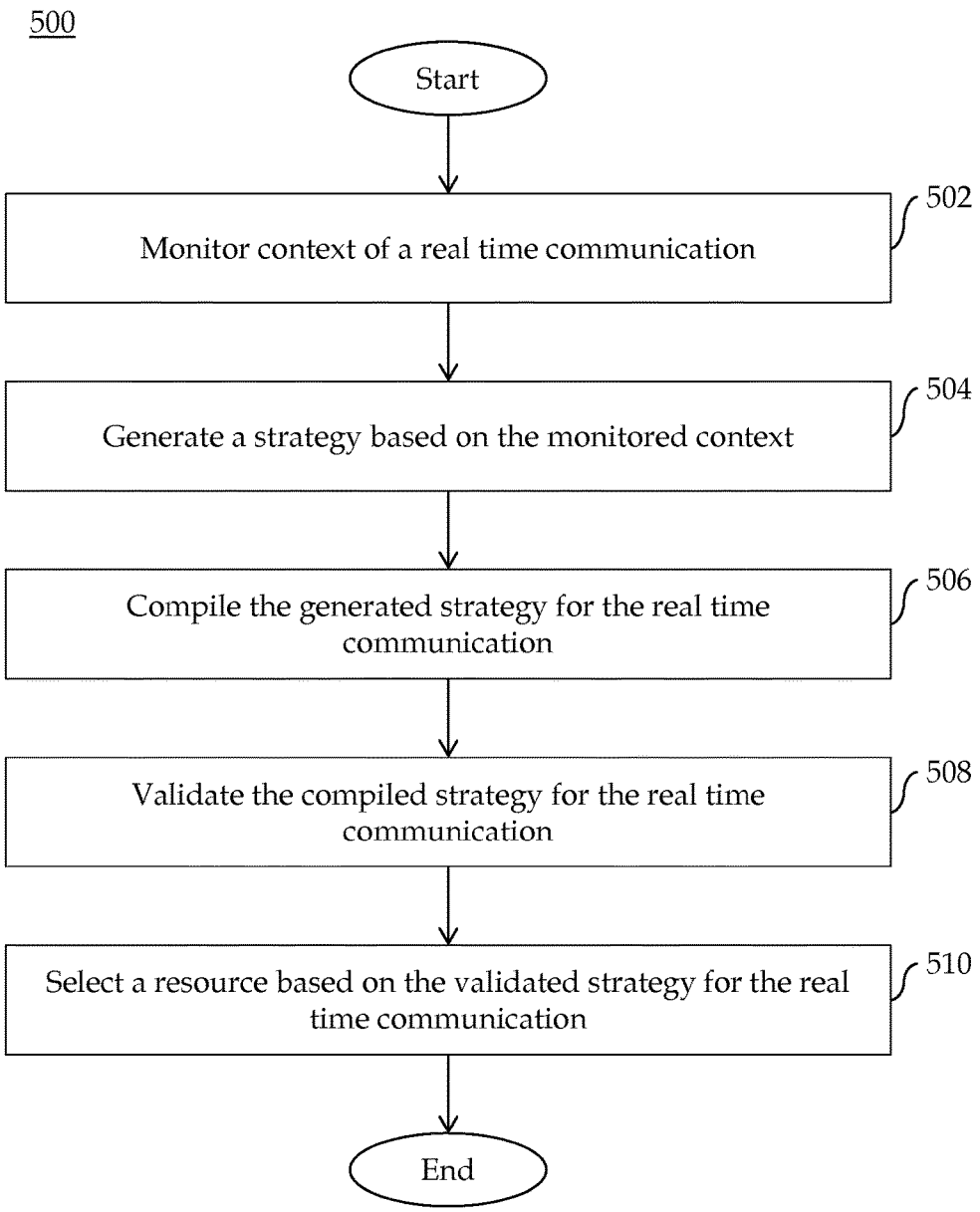
FIG. 5 depicts a flowchart of a method for managing a real time communication session in the contact center, according to an embodiment of the present invention.

FIG. 5 depicts a flowchart of a method 500 for managing a communication session in the contact center 100, according to an embodiment of the present invention.

At step 502, a call manager computer system 228 monitors details of a real time communication such as a type of communication session to the contact center 100, according to an embodiment of the present invention. The type of the communication session, i.e., whether the call made by a customer is, but is not restricted to, a voice session, a video session, a text message, an email session, an instant messaging, a Voice over Internet Protocol (VoIP), and so forth. The call manager computer system 228 also monitors static details about the real time communication session, for example, inputs selected by the customer in an IVR menu of the contact center 100. Further, the call manager computer system 228 monitors context of the communication, according to an embodiment of the present invention. The call manager computer system 228 monitors the communication session between the customer and an agent to monitor the context of the communication, in an embodiment of the present invention.

At step 504, the call manager computer system 228 generates a strategy based on the monitored context of the real time communication, according to an embodiment of the present invention. In an exemplary embodiment of the present invention, the strategy may be, for example, but is not limited to, a customer supplied strategy that may be used to select a resource for the real time communication. The call manager computer system 228 automatically generates a resource selection strategy based on the monitored context of the communication session, in an embodiment of the present invention. The resource selection strategy, may be, but is not limited to, an idle strategy, occupancy strategy, a proficiency strategy, a priority strategy, and the like.

Next, at step 506, the call manager computer system 228 compiles the generated strategy of the customer for the real time communication, according to an embodiment of the present invention. The call manager computer system 228 compiles a source code of the generated strategy into a machine code or a byte code. In an embodiment of the present invention, the source code of the generated strategy may be generated at a time when the customer selects options in the IVR menu of the contact center 100. The source code may be compiled into a Java byte code, in an embodiment of the present invention. In another embodiment of the present invention, other software may also be used to compile the source code of the generated strategies within the contact center 100.

Further, the call manager computer system 228 may utilize a reflection mechanism to analyze and optimize the structure and/or behavior of the byte code at the real time communication, according to an embodiment of the present invention. Also, the reflection mechanism may enable the contact center 100 to re-instantiate and/or re-create a new byte code that is provided by the customer.

Further, at step 508, the call manager computer system 228 validates the compiled strategy based on predefined attributes for the real time communication, according to an embodiment of the present invention. The predefined attributes may include, for example, but is not restricted to, an available static memory, an available heap memory, a processor, a stack size, a number of threads, and the like. In an embodiment of the present invention, each of the predefined attributes is associated with a threshold. The call manager computer system 228 rejects the validation of the generated strategy when a value of any of the parameters in the generated strategy exceeds a predefined threshold of the attributes, in an embodiment of the present invention.

Thereafter, at step 510, the call manager computer system 228 selects a resource for the real time communication, according to an embodiment of the present invention. The call manager computer system 228 selects a resource based on the validated strategy, in an embodiment of the present invention. The resource may include, but is not restricted to, a reserve agent, an agent, a Subject Matter Expert (SME), a supervisor, and the like. The selected resource may then provide a customer service to the customer. The call manager computer system 228 executes the validated strategy in a sandbox environment within the contact center 100, according to an environment of the present invention. The call manager computer system 228 executes the generated strategy as it may execute predefined strategies of the contact center 100, in an embodiment of the present invention.

Figure 6:
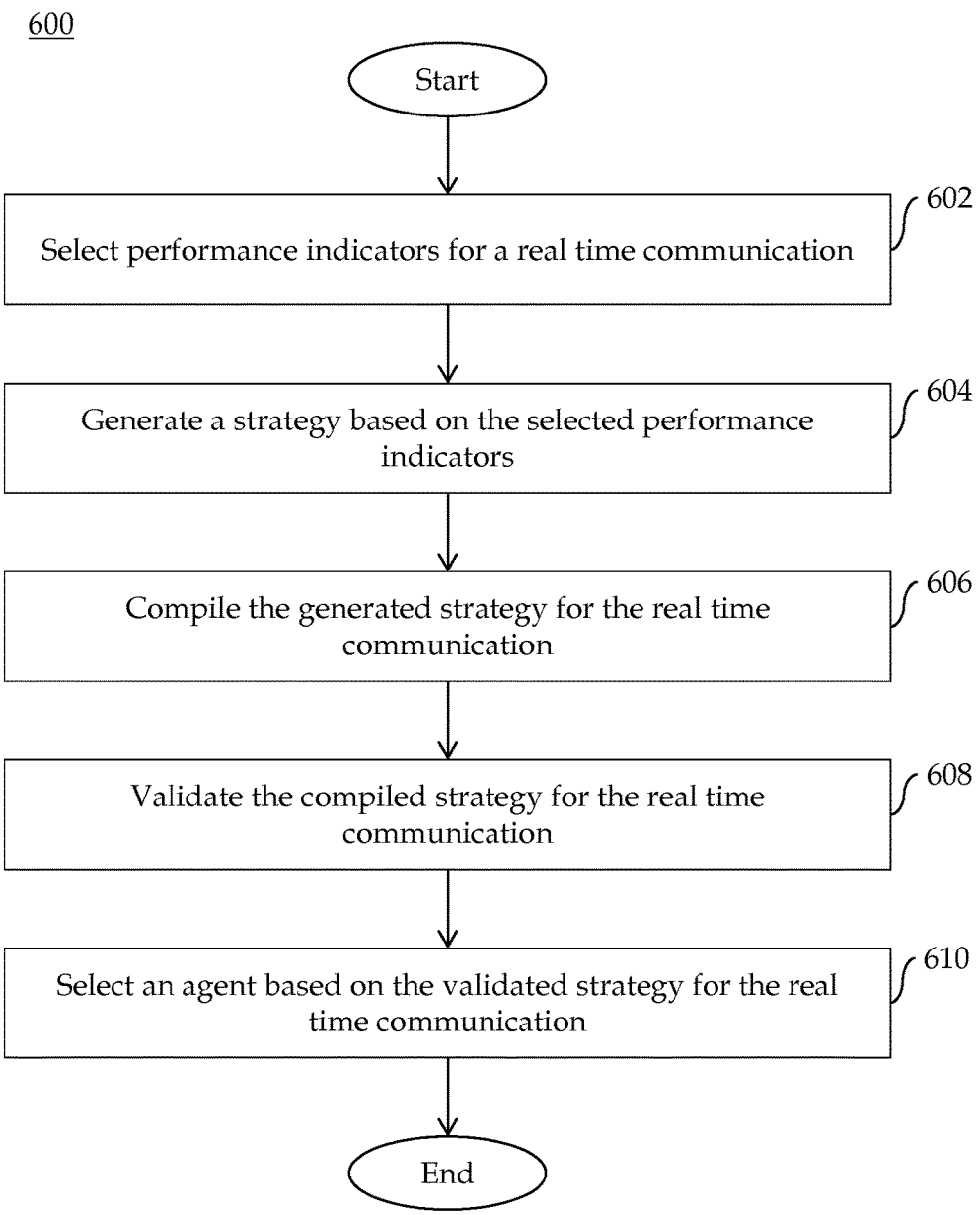
FIG. 6 depicts a flowchart of a method for managing a communication session in the contact center, according to another embodiment of the present invention.

FIG. 6 depicts a flowchart of a method 600 for managing a communication session in the contact center 100, according to another embodiment of the present invention.

At step 602, a call manager computer system 228 selects key performance indicators for a real time communication, according to an embodiment of the present invention. The key performance indicators may include, but is not restricted to, an experience of an agent, a spoken language of an agent, a proficiency of an agent, a rating of an agent, occupancy of an agent, predicted wait time, throughput, agent performance, and the like. In an embodiment of the present invention, the customer may select one or more key performance indicators for the real time communication.

The call manager computer system 228 enables the customer to select parameters based on the calendar, in an exemplary scenario. For example, the customer may select one or more key performance indicators that may be used to generate a strategy for use on weekdays and may further select different one or more key performance indicators that may be used to generate a strategy for use on weekends.

At step 604, the call manager computer system 228 generates a strategy based on the selected key performance indicators for the real time communication, according to an embodiment of the present invention. In an exemplary embodiment of the present invention, the strategy may be, for example, but is not limited to, a customer supplied strategy that may be used to select a resource for the real time communication. The call manager computer system 228 automatically generates a resource selection strategy based on the selected key performance indicators for the real time communication, in an embodiment of the present invention. The resource selection strategy, may be, but is not limited to, an idle strategy, occupancy strategy, a proficiency strategy, a priority strategy, and the like, in an exemplary embodiment of the present invention.

Next, at step 606, the call manager computer system 228 compiles the generated strategy of the customer for the real time communication, according to an embodiment of the present invention. The call manager computer system 228 compiles a source code of the generated strategy into a machine code or a byte code. In an embodiment of the present invention, the source code of the generated strategy may be generated at a time when the customer selects the key performance indicators in an IVR menu of the contact center 100 for the real time communication. The source code may be compiled into a Java byte code, in an embodiment of the present invention. In another embodiment of the present invention, other software languages may also be used to compile the source code of the generated strategies within the contact center 100.

Further, the call manager computer system 228 may utilize a reflection mechanism to analyze and optimize the structure and/or behavior of the byte code at the real time communication, according to an embodiment of the present invention. Also, the reflection mechanism may enable the contact center 100 to re-instantiate and/or re-create a new byte code provided by the customer.

Thereafter, at step 608, the call manager computer system 228 validates the compiled strategy based on predefined attributes for the real time communication, according to an embodiment of the present invention. The predefined attributes may include, for example, but is not restricted to, an available static memory, an available heap memory, a processor, a stack size, a number of threads, and the like. In an embodiment of the present invention, each of the predefined attributes is associated with a threshold. The call manager computer system 228 rejects the validation of the generated strategy when a value of any of the key performance indicators in the generated strategy exceeds a predefined threshold of the attributes, in an embodiment of the present invention.

Further, at step 610, the call manager computer system 228 selects a resource for the real time communication, according to an embodiment of the present invention. The call manager computer system 228 selects a resource based on the validated strategy, in an embodiment of the present invention. The resource may include, but is not restricted to, a reserve agent, an agent, a Subject Matter Expert (SME), a supervisor, and the like. The selected resource may then provide a customer service to the customer. The call manager computer system 228 executes the validated strategy in a sandbox environment within the contact center 100, according to an environment of the present invention.

Moreover, the call manager computer system 228 displays a graphical and/or a visual representation of the key performance indicators on a consumer device. In an embodiment of the present invention, the graphical and/or visual representation may be displayed on the customer device, which shows a comparison between results of the one or more performance indicators of the at least one generated strategy and the at least one predefined strategy of the contact center 100.

Figure 7:
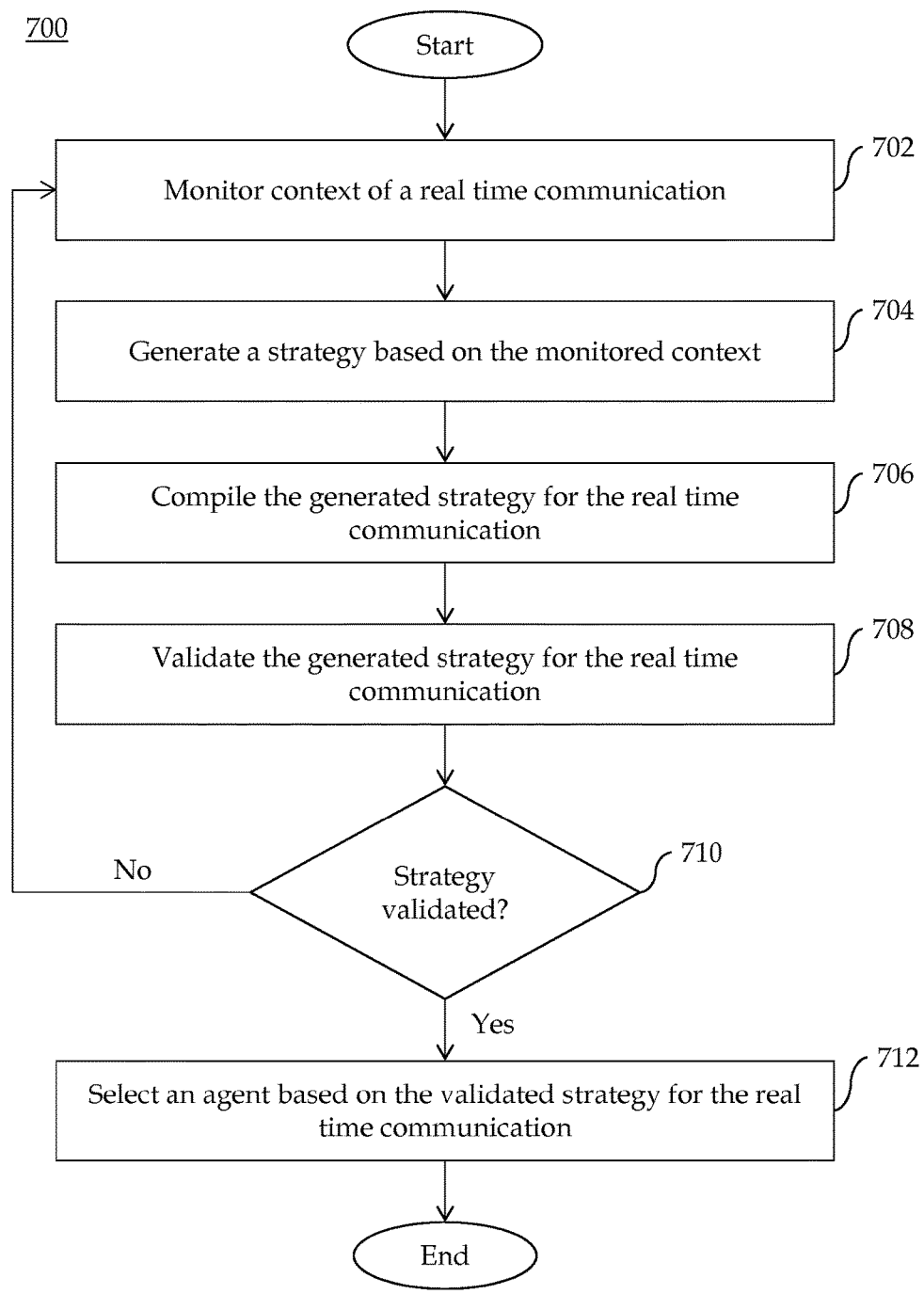
FIG. 7 depicts a flowchart of a method for managing a communication session in the contact center, according to an embodiment of the present invention.

FIG. 7 depicts a flowchart of a method 700 for managing a communication session in the contact center 100, according to an embodiment of the present invention.

At step 702, a call manager computer system 228 monitors details of a real time communication such as a type of communication session to the contact center 100, according to an embodiment of the present invention. The type of the real time communication, i.e., whether a call made by a customer is a voice session, a video session, a text message, an email, an instant messaging, a Voice over Internet Protocol (VoIP), and so forth. The call manager computer system 228 also monitors static details about the real time communication, for example, inputs selected by the customer in an IVR menu of the contact center 100. Further, the call manager computer system 228 monitors context of the real time communication, according to an embodiment of the present invention. The call manager computer system 228 monitors the communication session between the customer and an agent to monitor the context of the communication, in an embodiment of the present invention.

At step 704, the call manager computer system 228 generates a strategy based on the monitored context of the real time communication, according to an embodiment of the present invention. In an exemplary embodiment of the present invention, the generated strategy may be, for example, but is not limited to, a customer supplied strategy that may be used to select a resource for the real time communication. The call manager computer system 228 automatically generates a resource selection strategy based on the monitored context of the real time communication, in an embodiment of the present invention.

Next, at step 706, the call manager computer system 228 compiles the generated strategy for the real time communication, according to an embodiment of the present invention. The call manager computer system 228 compiles a source code of the generated strategy into a machine code or a byte code. In an embodiment of the present invention, the source code of the generated strategy may be generated at a time when the customer selects options in an IVR menu of the contact center 100. The source code may be compiled into a Java byte code, in an embodiment of the present invention. In another embodiment of the present invention, other software may also be used to compile the source code of the generated strategies within the contact center 100.

Further, at step 708, the call manager computer system 228 validates the compiled strategy based on predefined attributes for the real time communication, according to an embodiment of the present invention. The predefined attributes may include, for example, but is not restricted to, an available static memory, an available heap memory, a processor, a stack size, a number of threads, and the like. In an embodiment of the present invention, each of the predefined attributes is associated with a threshold.

At step 710, the call manager computer system 228 determines whether the generated strategy is validated or not based on the predefined attributes for the real time communication. If it is determined that the generated strategy is not validated, i.e., a data value of a key performance indicator in the generated strategy exceeds a predefined threshold of the predefined attributes, then the method 700 returns to the step 702. Otherwise, the method 700 proceeds towards step 712.

Thereafter, at step 712, the call manager computer system 228 selects a resource for the real time communication, according to an embodiment of the present invention. The resource may include, but is not restricted to, a reserve agent, an agent, a Subject Matter Expert (SME), a supervisor, and the like. The selected resource may then provide a customer service to the customer. The call manager computer system 228 executes the validated strategy in a sandbox environment within the contact center 100, according to an environment of the present invention.

Figure 8:
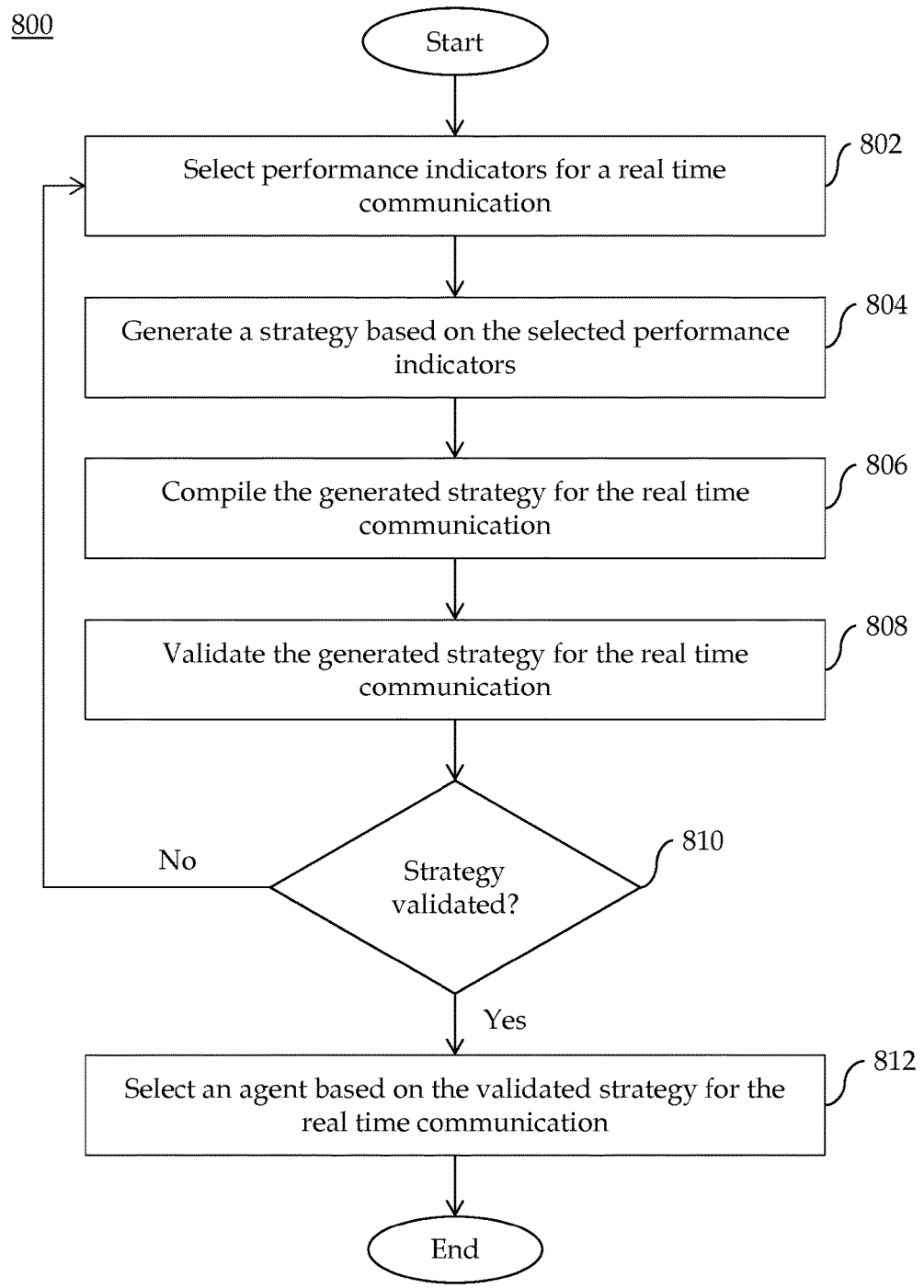
FIG. 8 depicts a flowchart of a method for managing a communication session in the contact center, according to another embodiment of the present invention.

FIG. 8 depicts a flowchart of a method 800 for managing a communication session in the contact center 100, according to another embodiment of the present invention.

At step 802, a call manager computer system 228 selects key performance indicators for a real time communication, according to an embodiment of the present invention. The key performance indicators may include, but is not restricted to, an experience of an agent, a spoken language of an agent, a proficiency of an agent, a rating of an agent, occupancy of an agent, predicted wait time, throughput, agent performance, and the like. In an embodiment of the present invention, the customer may select one or more key performance indicators for the real time communication. The key performance indicators may further be associated with a data value, in an embodiment of the present invention. The call manager computer system 228 enables the customer to select key performance indicators based on the calendar, in another embodiment of the present invention. For example, the customer may select one or more key performance indicators used to generate a strategy for use on weekdays and may further select different one or more key performance indicators that may be used to generate a strategy for use on weekends.

At step 804, the call manager computer system 228 generates a strategy based on the selected key performance indicators for the real time communication, according to an embodiment of the present invention. In an exemplary embodiment of the present invention, the strategy may be, for example, but is not limited to, a customer supplied resource selection strategy that may be used to select a resource for the real time communication. The call manager computer system 228 automatically generates a resource selection strategy based on the selected key performance indicators for the real time communication, in an embodiment of the present invention.

Next, at step 806, the call manager computer system 228 compiles the generated strategy of the customer for the real time communication, according to an embodiment of the present invention. The call manager computer system 228 compiles a source code of the generated strategy into a machine code or a byte code. In an embodiment of the present invention, the source code of the generated strategy may be generated at a time when the customer selects the key performance indicators for the real time communication. The source code may be compiled into a Java byte code, in an embodiment of the present invention. In another embodiment of the present invention, other software may also be used to compile the source code of the generated strategies within the contact center 100.

Further, the call manager computer system 228 may utilize a reflection mechanism to analyze and optimize the structure and/or behavior of the byte code at the real time communication, according to an embodiment of the present invention.

Thereafter, at step 808, the call manager computer system 228 validates the compiled strategy based on predefined attributes for the real time communication, according to an embodiment of the present invention. The predefined attributes may include, for example, but is not restricted to, an available static memory, an available heap memory, a processor, a stack size, a number of threads, and the like. In an embodiment of the present invention, each of the predefined attributes is associated with a threshold.

At step 810, the call manager computer system 228 determines whether the generated strategy is validated or not based on the predefined attributes for the real time communication. If it is determined that the generated strategy is not validated, i.e., a data value of a key performance indicator in the generated strategy exceeds a predefined threshold of the predefined attributes, then the method 800 returns to the step 802. Otherwise, the method 800 proceeds towards step 812.

Further, at step 812, the call manager computer system 228 selects a resource for the real time communication, according to an embodiment of the present invention. The resource may include, but is not restricted to, a reserve agent, an agent, a Subject Matter Expert (SME), a supervisor, and the like. The selected resource may then provide a customer service to the customer. The call manager computer system 228 executes the validated strategy in a sandbox environment within the contact center 100, according to an environment of the present invention.

Additionally, the call manager computer system 228 displays a graphical and/or a visual representation of the key performance indicators on a consumer device. In an embodiment of the present invention, the graphical and/or visual representation may be displayed on the customer device, which shows a comparison between results of the one or more performance indicators of the at least one generated strategy and the at least one predefined strategy of the contact center 100.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A call managing computer system for managing a communication session in a contact center, the system comprising:
   a processor;
   a memory in communication with the processor storing instructions executable by the processor, wherein the processor, when executing the executable instructions:
     monitors context of the communication session;
     generates a strategy based on the monitored context of the communication session and one or more performance indicators for the communication session, wherein the strategy is a contact center resource selection strategy for the communication session;
     determines, during the communication session, whether the generated strategy is validated or not based on an amount of contact center resources used when executing the generated strategy;
     prevents execution of the generated strategy when the generated strategy is not validated; and
     executes the validated strategy, when the generated strategy is validated, to select at least one agent of the contact center for the communication session.

2. The system of claim 1, wherein the processor, when executing the executable instructions, extracts one or more keywords from the monitored context of the communication session.

3. The system of claim 1, wherein the processor, when executing the executable instructions, selects the one or more performance indicators of the communication session.

4. The system of claim 3, wherein the processor, when executing the executable instructions, selects a predefined strategy from a database as the generated strategy.

5. The system of claim 1, wherein the processor, when executing the executable instructions, compiles the generated strategy.

6. The system of claim 1, wherein the generated strategy is validated based on at least one predefined attribute.

7. The system of claim 1, wherein the at least one agent of the contact center is one of a reserve agent, an agent, a supervisor, or a Subject Matter Expert (SME).

8. The system of claim 1, wherein the processor, when executing the executable instructions, drives a display of a graphical representation illustrating a comparison between results of the one or more performance indicators of the generated strategy and a predefined strategy of the contact center.

9. A computer-implemented method for managing a communication session in a contact center, the method comprising:
monitoring, by a processor of the contact center, context of a real time communication session by a customer to the contact center;
generating, by the processor of the contact center, a customer supplied strategy based on the monitored context of the real time communication session, wherein the strategy is a contact center resource selection strategy for the real time communication session;
determining during the communication session, by the processor of the contact center, whether the generated strategy is validated based on an amount of contact center resources used when executing the generated strategy;
preventing, by the processor, executing of the generated strategy when the generated strategy is not validated; and
executing, by the processor of the contact center, the validated strategy, when the generated strategy is validated, to select at least one agent of the contact center for the real time communication session.

10. The method of claim 9, further comprising:
extracting, by the processor of the contact center, one or more keywords from the monitored context of the real time communication session.

11. The method of claim 9, further comprising:
monitoring, by the processor of the contact center, one or more performance indicators of the real time communication session.

12. The method of claim 9, further comprising:
compiling, by the processor of the contact center, the generated strategy.

13. The method of claim 12, wherein the compiling step is a premium step reserved for customers who have entered into a service level agreement to receive compiled or pre-compiled strategies.

14. The method of claim 9, wherein the at least one generated strategy is validated based on at least one predefined attribute.

15. The method of claim 9, further comprising:
driving, by the processor of the contact center, a display of a graphical representation illustrating a comparison between results of the one or more performance indicators of the generated strategy and a predefined strategy.

16. A call managing computer system for managing a communication session in a contact center, the system comprising:
a processor;
a memory in communication with the processor storing instructions executable by the processor, wherein the processor, when executing the executable instructions:
selects one or more performance indicators for the communication session;
generates a strategy based on the selected one or more performance indicators, wherein the strategy is a contact center resource selection strategy for the communication session;
determines, during the communication session, whether the generated strategy is validated or not based on an amount of contact center resources used when executing the generated strategy;
prevents execution of the generated strategy when the generated strategy is not validated; and
executes the validated strategy, when the generated strategy is validated, to select at least one agent of the contact center for the communication session.

17. The system of claim 16, wherein the processor, when executing the executable instructions, compiles the generated strategy.

18. The method of claim 16, wherein the processor, when executing the executable instructions, drives a display of a graphical representation illustrating a comparison between results of the one or more performance indicators of the generated strategy and a predefined strategy.

19. The method of claim 16, wherein the generated strategy is validated based on at least one predefined attribute.

* * * * *